US009725341B2

(12) United States Patent
Moore et al.

(10) Patent No.: US 9,725,341 B2
(45) Date of Patent: Aug. 8, 2017

(54) METHODS FOR REMOVING CONTAMINANTS FROM AQUEOUS SYSTEMS

(75) Inventors: Lucas Moore, Marietta, GA (US); Amir Mahmoudkhani, Atlanta, GA (US); Jean Robert Durand, Atlanta, GA (US); Laura Sanders, Atlanta, GA (US)

(73) Assignee: Kemira Oyj, Helsinki (FI)

(*) Notice: Subject to any disclaimer, the term of this patent is extended or adjusted under 35 U.S.C. 154(b) by 0 days.

(21) Appl. No.: 13/468,784

(22) Filed: May 10, 2012

(65) Prior Publication Data
US 2012/0285893 A1 Nov. 15, 2012

Related U.S. Application Data

(60) Provisional application No. 61/484,409, filed on May 10, 2011, provisional application No. 61/484,313,
(Continued)

(51) Int. Cl.
*B01D 15/00* (2006.01)
*B01D 21/01* (2006.01)
(Continued)

(52) U.S. Cl.
CPC ............ *C02F 1/52* (2013.01); *B01D 21/01* (2013.01); *C02F 1/001* (2013.01); *C02F 11/008* (2013.01); *C02F 2001/007* (2013.01); *C02F 2101/103* (2013.01); *C02F 2101/105* (2013.01); *C02F 2101/106* (2013.01); *C02F 2101/20* (2013.01);
(Continued)

(58) Field of Classification Search
None
See application file for complete search history.

(56) References Cited

U.S. PATENT DOCUMENTS 4,844,815 A * 7/1989 Ader .................... C02F 9/00 106/900
5,023,012 A * 6/1991 Buchan et al. ............... 252/181
(Continued)

FOREIGN PATENT DOCUMENTS

CN 101519240 A 9/2009
CN 101941754 A 1/2011
(Continued)

OTHER PUBLICATIONS

Kemira, "Polyamines—Superfloc C-500 series", accessed Jun. 5, 2014, pp. 1-6; website: http://www.kemira.com/en/industries-applications/Pages/polyamines.aspx.*
(Continued)

*Primary Examiner* — Nam Nguyen
*Assistant Examiner* — Clare Perrin
(74) *Attorney, Agent, or Firm* — King & Spalding

(57) ABSTRACT

Methods for removing one or more contaminants from an aqueous stream comprising: adding one or more hydraulic binders and one or more promoters to the aqueous stream, and separating the contaminants from the aqueous stream are provided. The methods may be used for removing contaminants that are arsenic-based, selenium-based, cadmium-based, zinc-based, mercury-based, iron-based, chromium-based and/or phosphate-based.

16 Claims, 3 Drawing Sheets

Related U.S. Application Data filed on May 10, 2011, provisional application No. 61/539,757, filed on Sep. 27, 2011.

(51) Int. Cl.
| | | |
|---|---|---|
| *C02F 1/52* | (2006.01) | |
| *C02F 1/68* | (2006.01) | |
| *B01D 37/00* | (2006.01) | |
| *B01J 39/00* | (2006.01) | |
| *C02F 1/42* | (2006.01) | |
| *G21F 9/04* | (2006.01) | |
| *B03D 3/00* | (2006.01) | |
| *C02F 1/00* | (2006.01) | |
| *C02F 101/10* | (2006.01) | |
| *C02F 101/20* | (2006.01) | |
| *C02F 101/22* | (2006.01) | |
| *C02F 103/10* | (2006.01) | |
| *C02F 11/00* | (2006.01) | |

(52) U.S. Cl.
CPC .... *C02F 2101/203* (2013.01); *C02F 2101/22* (2013.01); *C02F 2103/10* (2013.01)

(56) References Cited

U.S. PATENT DOCUMENTS

| | | |
|---|---|---|
| 5,430,235 A | 7/1995 | Hooykaas et al. |
| 6,180,023 B1 | 1/2001 | Amer |
| 2001/0025945 A1* | 10/2001 | Amer ............................ 252/175 |
| 2006/0186054 A1* | 8/2006 | Webb et al. ................... 210/688 |
| 2007/0000839 A1 | 1/2007 | Wright |
| 2007/0151931 A1* | 7/2007 | SenGupta et al. ............. 210/702 |
| 2008/0302731 A1* | 12/2008 | Wang et al. ................... 210/688 |
| 2010/0168498 A1 | 7/2010 | Burba et al. |
| 2010/0187178 A1 | 7/2010 | Burba et al. |
| 2011/0020199 A1 | 1/2011 | Hemmings et al. |
| 2011/0024680 A1* | 2/2011 | Via et al. .................. 252/182.32 |
| 2011/0253634 A1* | 10/2011 | Soane et al. ................... 210/680 |
| 2012/0012531 A1 | 1/2012 | Al-Jlil |

FOREIGN PATENT DOCUMENTS

| | | | |
|---|---|---|---|
| WO | WO 2010080602 A2 * | 7/2010 | .............. B01J 20/02 |
| WO | WO 2011/050045 | 4/2011 | |
| WO | WO 2012/174118 | 12/2012 | |
| WO | WO 2013/117996 | 8/2013 | |

OTHER PUBLICATIONS

Supplemental European Search Report for European Patent Application No. EP 12782425.8, issued Dec. 17, 2014.

\* cited by examiner

METHODS FOR REMOVING CONTAMINANTS FROM AQUEOUS SYSTEMS

CROSS-REFERENCE TO RELATED APPLICATIONS

This application claims priority to U.S. Provisional Application No. 61/484,409, filed May 10, 2011; U.S. Provisional Application No. 61/484,413, filed May 10, 2011; and U.S. Provisional Application No. 61/539,757, filed Sep. 27, 2011; all of which are incorporated herein by reference.

FIELD OF THE ART

The embodiments described herein relate to a method for removing contaminants from aqueous streams, such as waste waters and the like.

BACKGROUND

Industrial waste waters commonly include a variety of contaminants which require treatment or removal before the waste water can be discharged. Certain industrial processes, such as mining, generate waste water with oxyanion and/or metal contaminants. Oxyanions are negatively charged inorganic molecules with various degrees of oxidation, for example; $CO_x$, $SO_x$, $NO_x$, $PO_x$, $ClO_2$, $AsO_x$, $SeO_x$, etc. Metal contaminants are toxic metals that may form poisonous water-soluble compounds, including for example mercury, cadmium, lead, chromium, molybdenum, and barium, among others. Both oxyanion and metal contaminants occur in various concentrations throughout the ecosystem and can be observed in elevated levels following various industrial processes, for example mining processes.

There are various commercial technologies for the removal of contaminants from an aqueous stream, including, for example: adsorption (e.g., adsorption on granular iron based media; adsorption on ion-exchange resins; and adsorption on activated alumina); chemical treatment (e.g., precipitation, cementation, coagulation, and flocculation methods); media filtration (filtering through sand, clay, titanium dioxide, ion exchange resins or membranes such as osmosis or nanofiltration membranes); and biomediated removal. Many of these methods require multiple steps to pretreat or chemically reduce the contamination. Many of these methods generate additional hazardous waste that must be further treated or handled.

The description herein of certain advantages and disadvantages of known methods is not intended to limit the scope of the present invention. Indeed the present embodiments may include some or all of the features described above without suffering from the same disadvantages.

BRIEF SUMMARY

Disclosed herein are methods for removing one or more contaminants from an aqueous stream comprising: adding one or more hydraulic binders and one or more promoters to the aqueous stream, and separating the one or more contaminants from the aqueous stream. Methods for removing one or more contaminants from an aqueous stream comprising: preparing a mixture of one or more hydraulic binders and one or more promoters, and passing an aqueous stream containing the one or more contaminants through the mixture are also provided.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

Figure 1:
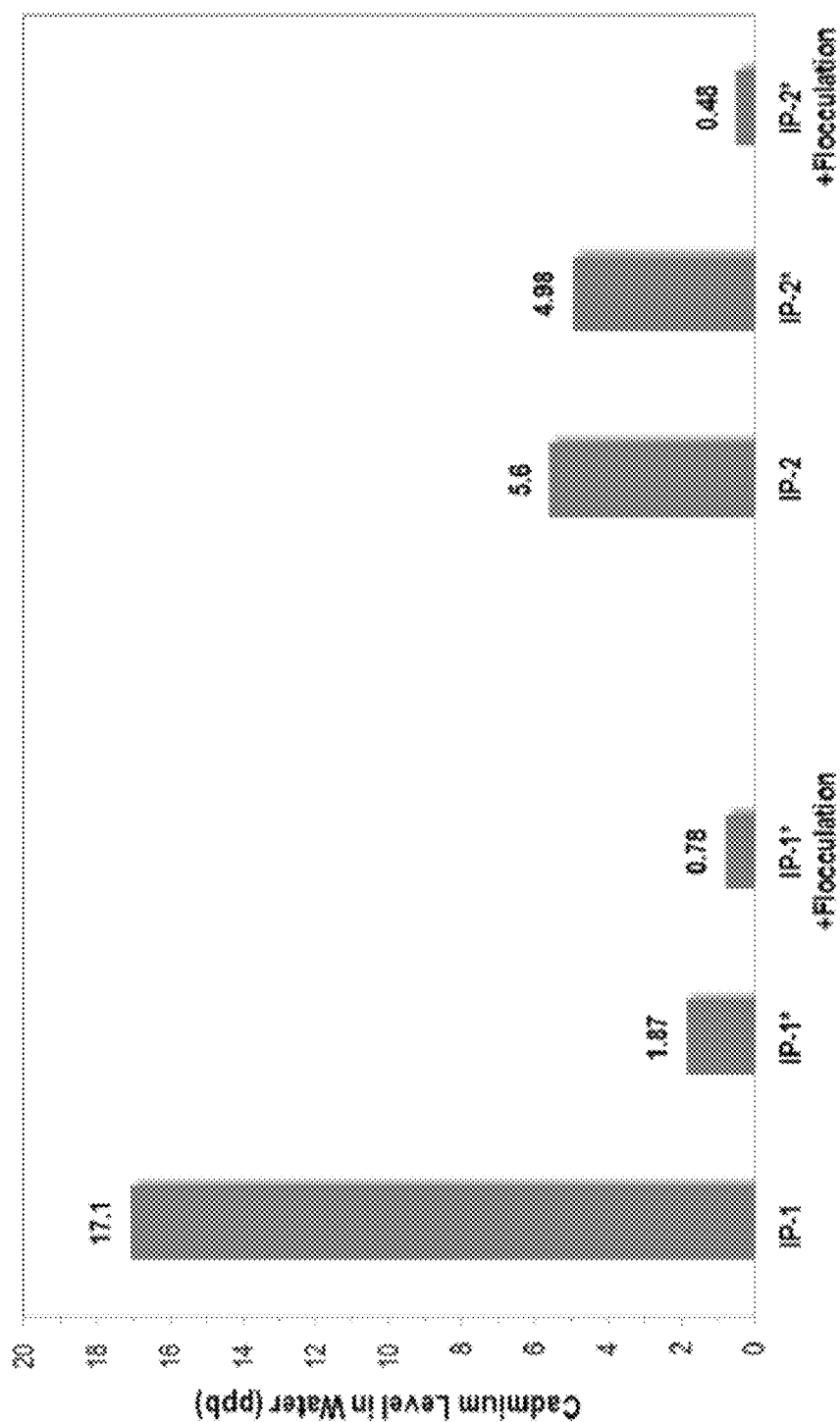
FIG. 1 shows the results of decontamination of a solution containing 30000 ppb of cadmium using exemplary hydraulic binders with or without promoters.

Methods for removing, or reducing the amount of, one or more types of contaminants from aqueous streams are provided, wherein the aqueous streams are treated with one or more hydraulic binders and one or more promoter compounds to form solids of the contaminants. After treatment, the solids can be separated from the aqueous stream, for example by gravity settling or mechanical separation. In exemplary embodiments, the contaminants include metals and/or oxyanions.

According to the embodiments described herein, hydraulic binders can be used in combination with promoters, for example compounds with nucleophilic moieties, to provide an in-situ solidification, or in-situ chemisorption, method for treatment of contaminated process waters, in particular for mining process water. As described herein, hydraulic binders, for example inorganic aluminosilicate based materials, can be cross-linked in water, or in aqueous streams, to generate an insoluble amorphous sorbent with active sites for chemisorption of many types of contaminants, including metals and oxyanions.

Methods for removing, or reducing the amount of, one or more types of contaminants aqueous streams are provided, wherein the aqueous streams are treated with one or more hydraulic binders and one or more promoter compounds to form solids of the contaminants.

In an exemplary embodiment, the method may be used to encapsulate and/or immobilize one or more contaminants that are present in water or aqueous streams. Encapsulated and/or immobilized species can go under common physical separation and removal of suspended solids from the aqueous stream.

Aqueous Streams

The expression "aqueous stream" as used herein refers to any aqueous liquid feed that contains undesirable amounts of contaminants, for example metals or oxyanions. Exemplary aqueous streams include but are not limited to drinking water, ground water, well water, surface water, such as waters from lakes, ponds and wetlands, agricultural waters, wastewater, such as wastewater or leaching water from mining or industrial processes, geothermal fluids, water from mining processes associated with smelting, mine dewatering, tailing impoundment treatment, chemical induced leaching, flotation, autoclave, acid mine drainage, and the like. In certain embodiments, the method can be used to remove one or more contaminants from any aqueous stream containing greater than about 2.0 ppb of the one or more contaminants. In one embodiment, the method is effective for treating aqueous streams containing more than 500 ppb of one or more contaminants. In an exemplary embodiment, the method is effective in decreasing levels of one or more contaminants to below about 100, about 10, about 5, or about 2 ppb.

Depending on the composition of the aqueous stream, the hydraulic binders, promoters, and other additives may change, concentrations of the hydraulic binders, promoters, and additives may change, and the sequence of adding the hydraulic binders, promoters, and additives may change. Such changes would be understood by those skilled in the art and may be determined from experience with different aqueous stream compositions.

In exemplary embodiments, the aqueous stream comprises water and one or more contaminants, for example metals and/or oxyanions.

In exemplary embodiments, the aqueous stream is an industrial stream, process stream, wastewater from flue gas desulfurization units, runoff from wet fly ash ponds, groundwater stream, and the like. In exemplary embodiments, the aqueous stream is produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. The embodiments described herein may be used to reduce or remove contaminants resulting from aqueous streams from various processes, including, for example, coal mining, industrial metals mining (e.g., phosphate, clays, white minerals, etc.), metals mining and processing (e.g., gold, copper, uranium, silver, nickel, etc.), metals smelting, municipal and industrial processes (e.g., coal burning power plants, and landfill leachate), oil processes (e.g., oil exploration, production, processing and/or refining).

Contaminants

The embodiments described herein may be used to reduce or remove a variety of metallic or non-metallic contaminants. As used herein, a "contaminant" refers to any substance which is not desirous, including those which may be considered harmful to humans or the environment, for example metals, non-metals, and/or oxyanions. The embodiments may remove metal contaminants, such as mercury, cadmium, zinc, manganese, lead, copper, chromium, molybdenum, gallium, indium, thallium, barium, silver, and/or other metal contaminants, including the various oxidation states of these metals or compounds comprising these metals. The embodiments may remove non-metallic contaminants such as, for example, antimony, arsenic, selenium, phosphates, and/or other non-metallic contaminants, including the various oxidation states of these non-metals or compounds comprising these non-metals, or compounds comprising arsenic, selenium, or phosphates.

An "oxyanion" or "oxoanion" is a chemical compound of the formula $A_xO_y^{z-}$ (where A represents a chemical element and O represents an oxygen atom). Oxyanions are formed by many chemical elements. Exemplary oxyanions include borate, carbonate, nitrate, phosphate, sulfate, chromate, arsenate, selenate, molybdate, nitrite, phosphate, sulfite, arsenite, selenite, hypophosphite, phosphate, hyposulfite, perchlorate, perbromate, periodate, permanganate, chlorate, chromate, bromate, iodate, chlorite, bromite, hypochlorite, and hypobromite.

In exemplary embodiments, the one or more contaminants may be any of the contaminants, or any mixture of the contaminants, described herein.

In an exemplary embodiment, the contaminant is a compound comprising arsenic or a mixture comprising arsenic-based compounds. Arsenic is a persistent, bio-accumulative toxin that is present in high concentrations in metal-containing ores such as iron, gold, nickel or cobalt, and can be a significant component in mining process water. Arsenic is stable in several oxidation states, under different redox conditions in water. However, when present in groundwater, arsenic occurs mostly in the forms of arsenite, As(III), and arsenate, As(V). In one embodiment, the contaminant is arsenate or arsenite. In one embodiment, the contaminant comprises arsenic, arsenite and/or arsenate, or a mixture comprising arsenic, arsenite and/or arsenate. In one embodiment, the arsenic-based contaminants in the aqueous stream are reduced to a level of less than about 100 ppb, about 50 ppb, about 20 ppb, about 10 ppb, or about 5 ppb. The US Environmental Protection Agency (EPA) recommends that levels of arsenic contaminants in water should be less than 10 ppb.

In an exemplary embodiment, arsenite is oxidized to arsenate prior to adding the hydraulic binder and promoter system, for example bleach or another oxidizing agent is added to the aqueous stream to oxidize arsenite. One of skill in the art would understand which oxidizing agents would be suitable.

In an exemplary embodiment, the contaminant is a compound comprising selenium or a mixture comprising selenium-based compounds. Selenium is a naturally occurring element that in small quantities (e.g., 0.1 to 0.5 ppm) can be a micronutrient, but in concentrations above 3 ppm it can be toxic. Selenium is present in high concentrations in metal-containing ores such as copper, silver, uranium and lead, and can be a significant component in mining process water. Selenium can also be a significant impurity in the production of sulfuric acid and mining/utilization of fossil fuels. In one embodiment, the contaminant is selenate (Se(VI)) or selenite (Se(IV)). In one embodiment, the contaminant comprises selenium, selenite and/or selenate, or a mixture comprising selenium, selenite and/or selenate. In one embodiment, the selenium-based contaminants in the aqueous stream are reduced to a level of less than about 100 ppb, about 50 ppb, about 20 ppb, about 10 ppb, or about 5 ppb. The EPA recommends that levels of selenates, selenites, or selenium in water should be less than 5 ppb.

In an exemplary embodiment, selenate is reduced to selenate prior to adding the hydraulic binder and promoter system, for example hydrochloric acid or another reducing agent is added to the aqueous stream to oxidize selenite. One of skill in the art would understand which reducing agents would be suitable.

In an exemplary embodiment, the contaminant is a compound comprising phosphorus or a mixture comprising phosphorus-based compounds. While phosphorus is an element that is essential to life, at elevated concentrations in aqueous systems it can lead to algal blooms that deplete the water's oxygen levels, which can have detrimental effects on aqueous biota. Phosphorus is frequently used in fertilizers in agriculture and farm production, which may contribute to increased concentrations of phosphorus in the water supply. In one embodiment, the contaminant is phosphate or phosphite. In one embodiment, the contaminant comprises phosphorus, phosphite and/or phosphate, or a mixture comprising phosphorus, phosphite and/or phosphate. In one embodiment, the phosphorus-based contaminants in the aqueous stream are reduced to a level of less than about 110 ppb, about 107 ppb, about 100 ppb, about 60 ppb, about 50 ppb, about 42 ppb, about 20 ppb, about 10 ppb, or about 5 ppb. In some areas, recommended levels of phosphorus-based contaminants in lakes, streams and canals are less than 50 ppb, less than 107 ppb and less than 42 ppb, respectively.

In an exemplary embodiment, the contaminant is a compound comprising cadmium or a mixture comprising cadmium-based compounds. Cadmium is a heavy metal in the same chemical family as zinc and mercury and prefers an oxidation state of +2 and is chemically similar to zinc. Cadmium typically is not found in an elemental pure state, but rather in zinc, lead, and copper ores as oxide, chloride or sulfide. Cadmium's high vapor pressure contributes to its toxicity and mobility throughout the environment. During various processes, such as smelting, cadmium may be vaporized and, if not contained, it will oxidize in the environment with either oxygen or other environmental contaminants, such as $SO_x$, $NO_x$, $CO_x$, chloride, etc. Cadmium may enter the environment through volcanic activities, mining processes, industrial processes, as well as burning of coal. Cadmium contamination of aquatic environments can be caused, for example, by smelting of non-ferrous metals, such as from mine drainage water, mine process water, leaching from tailings ponds and the mine site. In one embodiment, the contaminant comprises cadmium or a mixture comprising cadmium and/or cadmium-based compounds. In one embodiment, the cadmium-based contaminants in the aqueous stream are reduced to a level of less than about 50 ppb, about 20 ppb, about 10 ppb, about 5 ppb, about 2 ppb, about 1 ppb, about 0.5 ppb, about 0.4 ppb, about 0.3 ppb, about 0.25 ppb, about 0.2 ppb, about 0.15 ppb, or about 0.1 ppb. The EPA currently recommends that levels of cadmium or cadmium-based compounds in water should be less than 0.25 ppb.

In an exemplary embodiment, the contaminant is a compound comprising mercury or a mixture comprising mercury-based compounds. In one embodiment, the mercury-based contaminants in the aqueous stream are reduced to a level of less than about 1 ppm, about 50 ppb, about 20 ppb, about 10 ppb, about 5 ppb, about 2 ppb, about 1 ppb, about 0.5 ppb, about 0.25 ppb, or about 0.1 ppb. The EPA recommends that levels of mercury or mercury-based compounds in water should be less than 0.7 ppb.

In an exemplary embodiment, the contaminant is a compound comprising zinc or a mixture comprising zinc-based compounds. In one embodiment, the contaminant is comprises zinc or a mixture comprising zinc and/or zinc-based compounds. In one embodiment, the zinc-based contaminants in the aqueous stream are reduced to a level of less than about 50 ppb, about 20 ppb, about 10 ppb, about 5 ppb, about 2 ppb, about 1 ppb, about 0.5 ppb, about 0.25 ppb, or about 0.1 ppb.

Hydraulic Binders

As used herein, the phrase "hydraulic binder" includes those inorganic materials which are distinguished from non-hydraulic binders by their capability to harden upon hydration by formation of an inorganic polymeric network with poor permeability. In exemplary embodiments, the hydraulic binder can be a complex mixture of inorganic phases, or adhesive substances capable of uniting fragments to form a compact whole. In one embodiment, the hydraulic binder is a synthetic or natural inorganic polymer with a silica and/or alumina backbone. Exemplary inorganic polymers are polymers with a skeletal structure that does not include carbon atoms. Examples of suitable hydraulic binders include but are not limited to hydraulic lime, naturally occurring cements, pozzolana cements, gypsum cements, phosphate cements, high alumina cements, slag cements, cement kiln dust, silica cements, high alkalinity cements, Portland cements and combinations comprising at least one of the foregoing materials.

In exemplary embodiments, the hydraulic binder may be any of a variety of cements and pozzolanic materials. In one embodiment, the hydraulic binder cement is a hydraulic cement or mixture comprising one or more hydraulic cements. Exemplary hydraulic cements include Portland cement, pozzolana cement, gypsum cement, high alumina cement, slag cement, silica cement, kiln dust or mixtures thereof. Exemplary Portland cements may be those classified as class A, C, H and G cements according to American Petroleum Institute (API) specification for materials and testing for well cements. They can also be classified by ASTM C150 or EN 197 in classes of I, II, III, IV and V. In one embodiment, the hydraulic binder is a hydraulic cement that comprises calcium, aluminum, silicon, oxygen and/or sulfur which may set and harden by reaction with water. In one embodiment, the hydraulic binder is an alkaline cement. In a particular embodiment, the hydraulic binder comprises a mixture of two or more hydraulic cements.

In one embodiment, the hydraulic binder comprises one or more types of Portland cement. Portland cement is the most common type of cementitious material used around the world. It consists mainly of calcium silicates and aluminates and some iron-containing phases. When mixed with water, Portland cement undergoes various hydration reactions resulting in raised pH as well as generation of new species including calcium silicate hydrates (CSHs). CSH may bind strongly to other mineral grains, resulting in a setting process.

Portland cement (also referred to as Ordinary Portland Cement or OPC) is a basic ingredient of concrete, mortar, stucco and most non-specialty grout. Portland cement is a mixture that results from the calcination of natural materials such as limestone, clay, sand and/or shale. In particular, Portland cement comprises a mixture of calcium silicates, including $Ca_3SiO_5$ and $Ca_2SiO_4$, which result from the calcination of limestone ($CaCO_3$) and silica ($SiO_2$). This mixture is known as cement clinker. In order to achieve the desired setting qualities in the finished product, calcium sulfate (about 2-8%, most typically about 5%), usually in the form of gypsum or anhydrite, is added to the clinker and the mixture is finely ground to form the finished cement powder. For example, a typical bulk chemical composition of Portland cement is about 61 to about 67 wt % calcium oxide (CaO), about 12 to about 23 wt % silicon oxide ($SiO_2$), about 2.5 to about 6 wt % aluminum oxide ($Al_2O_3$), about 0 to about 6 wt % ferric oxide ($Fe_2O_3$) and about 1.5 about 4.5 wt % sulfate. The properties of Portland cement can be characterized by the mineralogical composition of the clinker. Major clinker phases present in Portland cements include: Alite ($3CaO.SiO_2$), Belite ($2CaO.SiO_2$), Aluminate ($3Cao.Al_2O_3$) and Ferrite ($4CaO.Al_2O_3.Fe_2O_3$).

In an exemplary embodiment, the hydraulic binder is a fine powder mixture which contains more than 90% Portland cement clinker, calcium sulfate and up to 5% minor constituents (see European Standard EN197.1).

During the preparation of the cement, a grinding process may be controlled to obtain a powder with a broad particle size range, in which typically 15% by mass consists of particles below 5 μm diameter, and 5% of particles above 45 μm. The measure of particle fineness usually used is the "specific surface area", which is the total particle surface area of a unit mass of cement. The rate of initial reaction (up to 24 hours) of the cement on addition of water is directly proportional to the specific surface area.

In an exemplary embodiment, supplementary cementitious materials, such as fly ash, silica fume or natural pozzolans may be used together with the hydraulic binder.

As used herein, a pozzolan is a material which, when combined with calcium hydroxide, exhibits cementitious properties.

Promoters

In exemplary embodiments, the promoter is a compound that comprises nucleophilic functionality, e.g. a nucleophilic moiety. For example, elemental sulfur, sodium sulfide, thiols, organic sulfides, nitriles, amines, amides, organophosphines, alcohols, esters, acids, ethers, other sulfur-containing compounds, other hydroxyl-containing compounds, and mixtures thereof, can be used as promoter compounds in the embodiments described herein. One having ordinary skill in the art would understand which compounds would have sufficient nucleophilic function to provide a synergistic system.

In an exemplary embodiment, the promoter is elemental sulfur. In one embodiment, the promoter is elemental sulfur or a sulfur-containing compound. In one embodiment, the promoter is a mixture of promoter compounds, for example a mixture including elemental sulfur. In an exemplary embodiment, the promoter is sodium sulfide. In certain embodiments, the promoter is an amine. In other embodiments, the promoter is an organophosphine. In one embodiment, the promoter is an alcohol. In certain embodiments, the promoter is a sulfur-containing compounds, for example a sulfide, a polysulfide, hydrogen sulfide, dimethylthiolcarbamate, diethylthiolcarbamate, sodium sulfide, sodium thiosulfate, calcium polysulfide, and mixtures thereof.

In exemplary embodiments, the promoter is capable of interacting (e.g. cross-linking, coordinating, reducing or other modes of interacting) with contaminants, such as arsenic-based, selenium-based, cadmium-based, zinc-based, mercury-based, iron-based, chromium-based and/or phosphate-based contaminants. In one embodiment, the promoter is capable of cross-linking with contaminants. In another embodiment, the promoter is capable of coordinating with contaminants. In another embodiment, the promoter is capable of reducing contaminants.

In one embodiment, the promoter is sulfur or a sulfur-based compound and the contaminant is metal-based contaminant, for example cadmium or mercury. In another embodiment, the promoter is an amine, an organophosphine or an alcohol, and the contaminant comprises iron. In one embodiment, the promoter is an amine or an alcohol and the contaminant comprises chromium. As referred to herein, the term "organophosphine" refers to triorganophosphorus compounds and does not include phosphane ($PH_3$).

Methods

A symbiotic system refers to the combination of the hydraulic binder and the promoter which by acting together surprisingly produce a synergistic effect. In exemplary embodiments, the interaction of the hydraulic binders and the promoters in water or aqueous streams is symbiotic.

In certain embodiments, the hydraulic binder, for example Portland cement, when added to the aqueous stream in the absence of a promoter, may have little effect on concentration of the contaminants, for example cadmium and/or mercury. In comparison, when a promoter, for example elemental sulfur, is used in combination with the hydraulic binder, significant removal of various contaminants in the aqueous stream can be achieved. The use of the hydraulic binder and promoter in the methods described herein, facilitates the encapsulation and/or immobilization of the contaminants. The resulting amorphous solid mass, or suspended solids, may be separated by gravity settling, filtration or other conventional solid removal methods.

In exemplary embodiments, the one or more hydraulic binders and one or more promoters react in situ to generate a sorbent material. The contaminant species can be chemically adsorbed on the surface of the sorbent material, for example in the cavities of the sorbent material. The use of one or more hydraulic binders with one or more promoters is extremely efficient for removing contaminants, for example cadmium or mercury species, from aqueous streams.

In exemplary embodiments, the ratio of the weight of the hydraulic binders to the weight of the promoter used in the methods is in the range of about 10:1 to about 1:1. For example, the ratio of the weight of the hydraulic binders to the weight of the promoter used in the methods is about 10:1, about 9:1, about 8:1, about 7:1, about 6:1, about 5:1, about 4:1, about 3:1, about 2:1, or about 1:1.

In exemplary embodiments, the method may also comprise adding one or more additives to the aqueous stream. Exemplary additives include but are not limited to aluminum-containing minerals or clays, or iron-containing minerals or clays, such as kaolinate, aluminate, ferrohydrate, hematite, bentonite, and the like. The additives may be added to the aqueous streams before, during or after addition of the hydraulic cement and/or promoter. The additive may be added to the aqueous stream in an amount of about 0.1% to about 50%, about 0.1% to about 40%, about 0.1% to about 30%, about 0.1% to about 20%, about 0.1% to about 10%, by weight of the one or more hydraulic binders.

In exemplary embodiments, the dosage of hydraulic binders used in the method is about 10 ppm to about 50,000 ppm, about 10 ppm to about 20,000 ppm, about 10 ppm to about 12,000 ppm, about 20 ppm to about 10,000 ppm, about 20 ppm to about 1000 ppm, about 20 ppm to about 500 ppm.

In certain embodiments, the contaminant is selenium-based and the dosage of the hydraulic binders used in the method is about 100 ppm to about 50,000 ppm, or about 6000 ppm to about 20,000 ppm. In certain embodiments, the contaminant is arsenic-based and the dosage of the hydraulic binders used in the method is about 50 ppm to about 50,000 ppm, or about 500 ppm to about 5000 ppm. In certain embodiments, the contaminant is phosphorus-based and the dosage of the hydraulic binders used in the method is about 50 ppm to about 20,000 ppm, or about 50 ppm to about 1000 ppm. In certain embodiments, the contaminant is cadmium- and/or zinc-based and the dosage of the hydraulic binders used in the method is about 50 ppm to about 50,000 ppm, or about 300 ppm to about 12,000 ppm. In certain embodiments, the contaminant is mercury-based and the dosage of the hydraulic binders used in the method is about 50 ppm to about 50,000 ppm, or about 300 ppm to about 12,000 ppm.

In an exemplary embodiment, the amount of the one or more hydraulic binders and one or more promoters added during the process is the amount necessary to reduce the concentration of the one or more contaminants to below about 100 ppb, about 50 ppb, about 40 ppb, about 30 ppb, about 20 ppb, about 10 ppb, about 5 ppb, about 4 ppb, about 3 ppb, about 2 ppb, about 1 ppb, about 0.5 ppb, about 0.4 ppb, about 0.3 ppb, about 0.25 ppb, about 0.2 ppb, about 0.15 ppb, or about 0.1 ppb, in total or per species.

In certain embodiments, the one or more hydraulic binders and one or more promoters may be added to the aqueous stream in one or more doses as needed or in intervals, in a stepwise fashion, or in a continuous fashion.

In exemplary embodiments, the method for removing one or more contaminants from an aqueous stream comprises: adding one or more hydraulic binders and one or more promoters to the aqueous stream, and separating the contaminants from the aqueous stream. In other embodiments, the method for removing one or more contaminants from an aqueous stream comprises: preparing a mixture of one or more hydraulic binders and one or more promoters, and passing an aqueous stream containing contaminants through the mixture.

In exemplary embodiments, the one or more hydraulic binders and the one or more promoters can be added to the aqueous stream simultaneously or sequentially. In certain embodiments, the one or more hydraulic binders and the one or more promoters may be premixed before being added to the aqueous stream or before the aqueous stream containing contaminants is passed through the mixture.

In an exemplary embodiment, the hydraulic binders and promoters, and optionally other additives, are mixed in water and allowed to settle. The resulting solid can be processed, for example milled, into a controlled particle size, for example about 200 to about 1000 micron. these solid particles can be applied as a filter media wherein the aqueous stream containing contaminants is run through the bottom of the filter media, through the top of the filter media, or into a closed circuit.

In exemplary embodiments, the hydraulic binders and promoters can be added to, or applied to, the aqueous stream in a process that may be a batch process, a continuous process or a semicontinuous process. Such processes can include settling or filtering processes. In exemplary embodiments, the hydraulic binders and promoters can be added as dry materials or as dispersions, for example dispersions in water.

In exemplary embodiments, the hydraulic binders and promoters are added to an aqueous stream, for example in a reactor or mixing tank, and the aqueous stream is stirred or agitated. In one embodiment, after adding the hydraulic binders and promoters, the aqueous stream is stirred or agitated for a period of time from about 5 minutes to about 12 hours, or about 1 hour to about 3 hours. In exemplary embodiments, after adding the hydraulic binders and promoters, the aqueous stream is stirred for at least about 15 minutes, about 30 minutes, about one hour, about two hours, or about 3 hours. There is no particular limit on the amount of time that the aqueous stream may be stirred after adding the hydraulic binders and promoters.

In exemplary embodiments, after agitation of the aqueous stream, the stream may be transferred to a thickener or settling tank, or may be allowed to settle where it is. In certain embodiments, a flocculant may be added to assist in settling.

In exemplary embodiments, the method may further comprise adding a flocculant. Any suitable flocculant or mixture of flocculants may be used in the method described herein. In certain embodiments, the one or more flocculants added to the aqueous stream comprise one or more polymer flocculants. In exemplary embodiments, the polymer flocculants may be anionic, nonionic, or cationic, for example an acrylamide flocculant. Any polymer flocculants known in the art may be used in the processes described herein. Nonlimiting examples of exemplary polymer flocculants include, for example, flocculant-grade homopolymers, copolymers, and terpolymers prepared from monomers such as (meth)acrylic acid, (meth)acrylamide, 2-acrylamido-2-methylpropane sulfonic acid, and ethylene oxide. In one embodiment, the polymer flocculant is an anionic polymer. In one embodiment, the polymer flocculant is a nonionic polymer. In one embodiment, the polymer flocculant is a mixture of an anionic polymer and a nonionic polymer. In an exemplary embodiment, the one or more flocculants comprises a polyacrylamide flocculant.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

In the exemplary embodiments, the dosage of the one or more flocculants can be any dosage that will achieve a necessary or desired result. In one embodiment, the dosage of the one or more flocculants is about 5 ppm to about 100 ppm; about 10 ppm to about 70 ppm; or about 20 ppm to about 50 ppm. In one embodiment, the dosage of the one or more flocculants is less than about 100 ppm, about 70 ppm, or about 50 ppm.

In certain embodiments, the method may further comprise the step of adding one or more absorbents and/or one or more coagulants.

In an exemplary embodiment, the method further comprises the step of adding one or more additional absorbents before the addition of the one or more flocculants. An "absorbent" as referred to herein includes silica-based compounds, for example an inorganic silica-based polymer, a clay-based material, cellulose, alumina-cased adsorbents, ferrohydrate adsorbents, carbon, for example carbon black, or a mixture thereof.

In exemplary embodiments, the dosage of the one or more absorbents can be any dosage that will achieve a necessary or desired result. In one embodiment, the dosage of the one or more absorbents is about 1 to about 10,000 ppm; about 50 to about 5000 ppm; or about 100 to about 1000 ppm. In one embodiment, the dosage of the one or more absorbents is less than about 10,000 ppm, about 5000 ppm, or about 1000 ppm.

In an exemplary embodiment, the method further comprises the step of adding one or more coagulants before the addition of the one or more flocculants. A "coagulant" as referred to herein includes iron compounds or salts, for example ferric or ferrous compounds or salts; aluminum compounds or salts; hydrated lime; magnesium carbonate; a polymer that contains one or more quaternized ammonium groups or mixtures thereof. Iron coagulants include, for example, ferric sulfate, ferrous sulfate, ferric chloride and ferric chloride sulfate. Aluminum coagulants include, for example, aluminum sulfate, aluminum chloride and sodium aluminate. Polymer coagulants that contain one or more quaternized ammonium groups include, for example acryloyloxyethyltrimethylammonium chloride, methacryloyloxyethyltrimethylammonium chloride, methacrylamidopropyltrimethylammonium chloride, and acrylamidopropyltrimethylammonium chloride.

In the exemplary embodiments, the dosage of the one or more coagulants can be any dosage that will achieve a necessary or desired result. In one embodiment, the dosage of the one or more coagulants is about 1 to about 15 times the amount of the contaminants by mass (e.g. Fe:As mass ratio). In one embodiment, the dosage of the one or more coagulants is less than about 15 times the amount of the contaminants by mass.

According to the embodiments, the immobilized or solidified contaminants may then be recovered and removed by using any suitable method known in the art. In exemplary embodiments, the separation step may be accomplished by any means known to those skilled in the art, including but not limited to gravity settling, centrifuges, hydrocyclones, decantation, filtration, thickeners or another mechanical separation method.

In exemplary embodiments, the contaminants, once treated with the hydraulic binders and promoters, may be handled or processed in any manner as necessary or desired. In one embodiment, the contaminants should be handled in compliance with governmental regulations. In some embodiments, the contaminants may be disposed of, sent to a landfill, or when solids are a concentrated source of minerals, the solids may be used a raw materials or feed to produce compounds for commercial products.

In certain embodiments, the method comprises adding one or more reducing agents, for example a sulfur-containing compound, sodium borohydride, aluminum hydride, sodium bisulfite, hydrochloric acid or another reducing agent. One of skill in the art would understand what reducing agents could be used. The sulfur-containing compound can be, for example, a sulfide, a polysulfide, hydrogen sulfide, dimethylthiolcarbamate, diethylthiolcarbamate, sodium sulfide, sodium thiosulfate, calcium polysulfide, and mixtures thereof. The amount of the reducing agent to be added to the aqueous stream is dependent on the amount of contaminant present in the aqueous stream. In one embodiment, the amount of the one or more reducing agents to be added is in the range of about 1.0 mole to about 4.0 moles, about 1.0 mole to about 3.0 moles, or about 1.0 mole to about 2.0 moles, per mol of contaminants. In exemplary embodiments, the amount of the reducing agent added to the aqueous stream is an amount sufficient to maintain a reducing environment.

In exemplary embodiments, the methods may be used to remove contaminants in non-ferrous metal processes, such as mining and smelting of non-ferrous metals, for example zinc production; iron and/or steel production; fuel combustion, such as coal, oil or wood; cement manufacturing; phosphate fertilizer manufacture; or sewage sludge incineration.

In an exemplary embodiment, the method can be easily incorporated into common water treatment practices in the form of in-line addition.

In exemplary embodiments, the methods described herein can be used to provide an economical and versatile solution for treatment of contaminated mining process waters within an operational and environmental friendly process.

In exemplary embodiments, the method is useful for solidification/stabilization (S/S) treatment of solid wastes. S/S treatment of waste involves mixing a binder into contaminated media or waste to immobilize contaminants within the treated material. The chemical properties of the binder may be used to lower the solubility of toxic contaminants in the waste and may also be used to lower the toxicity of a hazardous constituents. S/S is used to treat industrial solid waste to make it safe for land disposal. S/S is also used to treat contaminated soil, sediment or sludge at clean-up (remediation) sites.

The following examples are presented for illustrative purposes only, and are not intended to be limiting.

EXAMPLES

In the following examples, the cements referenced include: Cement A: API Class A Cement (similar to construction grade Portland cement), Cement B: API Class G Cement (Standard Oilwell Cement), Cement C: ReezCEM 800 (a blended microfine cement based on Cement A+Fly Ash).

In each example, the concentration of the contaminants referenced refers to total ion concentrations.

The components of the hydraulic binder compositions as referred to in the following examples are provided in the table below. The amounts provided are those amounts mixed as a dry blend and then added to 500 ml of water except as noted otherwise.

TABLE 1

Treatment Compositions

| Sample Name | Hydraulic Binder (amount in grams) | Promoter | Other additives | Notes |
|---|---|---|---|---|
| IP-1 | Portland Cement (0.3 g) | — | — | dry blend |
| IP-2 | Portland Cement (0.3 g) | — | Bentonite (0.02 g) | dry blend |
| IP-1* | Portland Cement (0.3 g) | Sulfur (0.06 g) | — | dry blend |
| IP-2* | Portland Cement (0.3 g) | Sulfur (0.06 g) | Bentonite (0.02 g) | dry blend |
| IP-1-N | Portland Cement (0.3 g) | Sulfur (0.06 g) | Sodium Sulfide (0.02 g) | pre-wet; 70 g of the mixture is added to 150 mls water and mixed for 3 hours before use |

Example 1

In this example, and in Examples 2, 3, and 4, cadmium chloride ($CdCl_2$) was purchased from Aldrich and used as received with no further purification. Lab-made aqueous solutions containing cadmium were prepared by dissolution of the chemical in city of Atlanta tap water. A Thermo Scientific ICP-AES system model iCAP 6200 equipped with a charge injection device (CID) detector and a CETAC ASX-520 autosampler was used for determination of cadmium species in water samples. Low detection limits (0.2 ppb for cadmium) were achieved by pre-concentration of 100 ml aqueous samples. Quantitative elemental analysis of trace elements was conducted on a Bruker S4 Explorer wavelength-dispersive X-ray fluorescence spectrometer.

Two hydraulic binder compositions (IP-1 and IP-2) were evaluated for their effectiveness in the treatment of cadmium contaminated water samples. Water samples were prepared having 3000 ppb cadmium. The water samples were treated with IP-1 or IP-2 and mixed for 2-3 hours. Resulting suspensions were then left for gravity settling. Filtration of supernatant on a Whatman qualitative filter paper No. 5 (pore size of 2.5 μm) provided a clear, visible solid free water sample for ICP analysis. As shown in FIG. 1, the hydraulic binder alone reduced the cadmium concentration to 17 ppb (for IP-1) or 5.6 ppb (for IP-2).

Example 2

Water samples were treated with compositions containing a hydraulic binder and a sulfur promoter. Water samples were prepared having 30,000 ppb cadmium. The water samples were treated with IP-1* or IP-2* and mixed for 2-3 hours. Resulting suspensions were then left for gravity settling. Filtration of supernatant on a Whatman qualitative filter paper No. 5 (pore size of 2.5 μm) provided a clear, visible solid free water sample for ICP analysis. As shown in FIG. 1, hydraulic binder plus promoter samples (IP-1* and IP-2*, respectively), the cadmium was further reduced, for example, to 1.7 ppb in the case of IP-1* treatment.

Example 3

Water samples were treated with compositions containing a hydraulic binder and a sulfur promoter, were subsequently flocculated using a commercial flocculant to accelerate the settling of suspended solids instead of gravity settling. Water samples were prepared having 30,000 ppb cadmium. The water samples were treated with IP-1* or IP-2*, and were mixed for 2-3 hours. Using a plastic syringe, a flocculant (Superfloc A-130HMW, Kemira Oyj) was added to each sample solution to obtain 0.5 to 7.5 ppm weight/weight in the sample. The samples were stirred for one minute, and allowed to settle for at least five minutes. The beaker contents were filtered using vacuum filtration or syringe filtration with 0.45 micron filters. As shown in FIG. 1, in these treatments (IP-1*+Flocculation and IP-2*+Flocculation, respectively), the cadmium level was even further reduced to 0.8 ppb (for IP-1*) and 0.5 ppb (for IP-2*). This indicated the presence of fine solids in the sample fluid which may pass through the filter paper at the first trails.

Example 4

Figure 2:
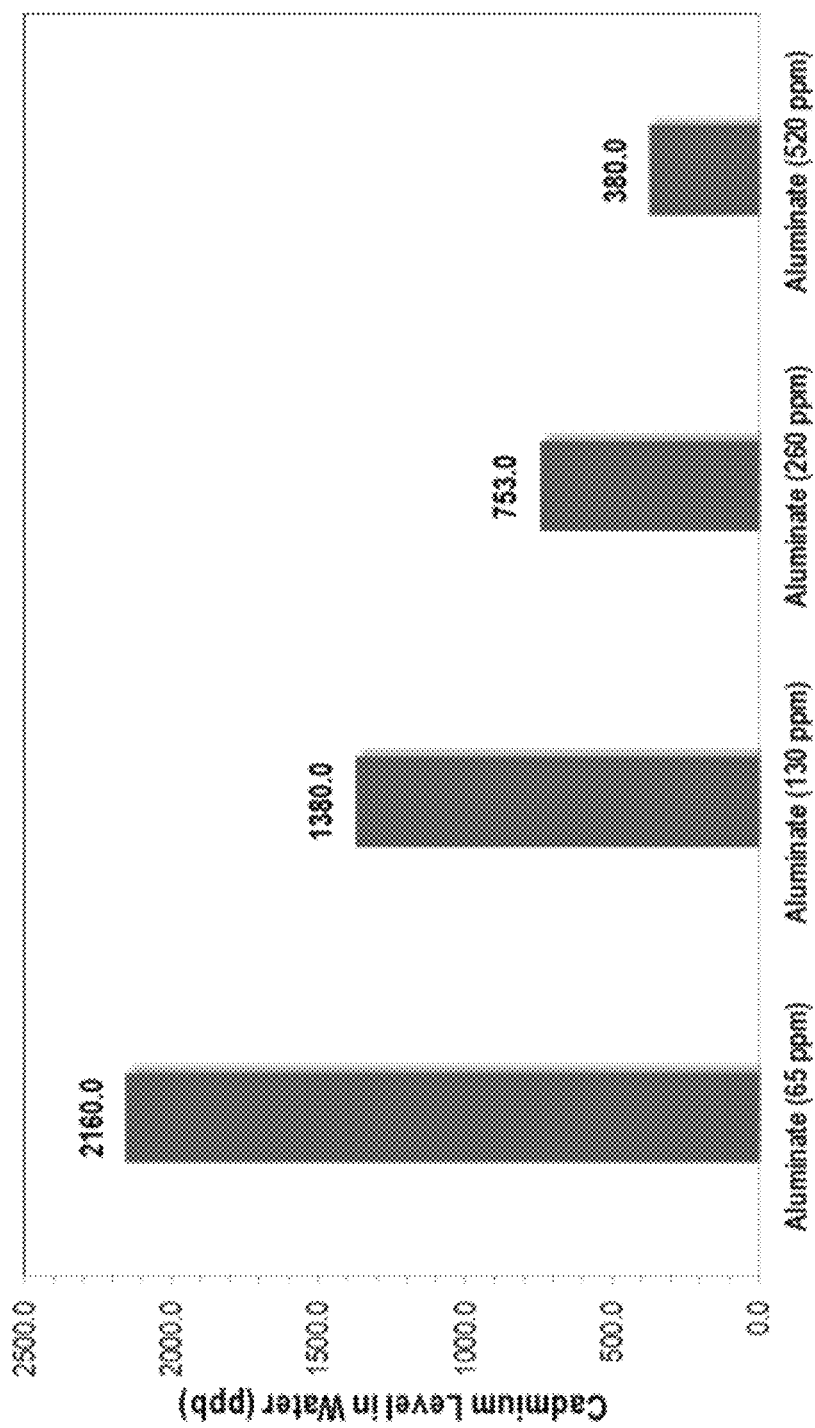
FIG. 2 shows the results of decontamination of a solution containing 11000 ppb of cadmium using various dosages of a commercially-available sodium aluminate coagulant.

In this comparative example, traditional ferrous chloride and sodium aluminate coagulants were evaluated under lab conditions and cadmium contaminated water having 11000 ppb cadmium. Treatment with ferrous chloride did not lead to any reduction in cadmium, but treatment with sodium aluminate showed a reduction in cadmium level in contaminated water. As shown in FIG. 2, cadmium level can be reduced from 11000 ppb to 380 ppb when 520 ppm of aluminate coagulant is used.

Example 5

Figure 3:
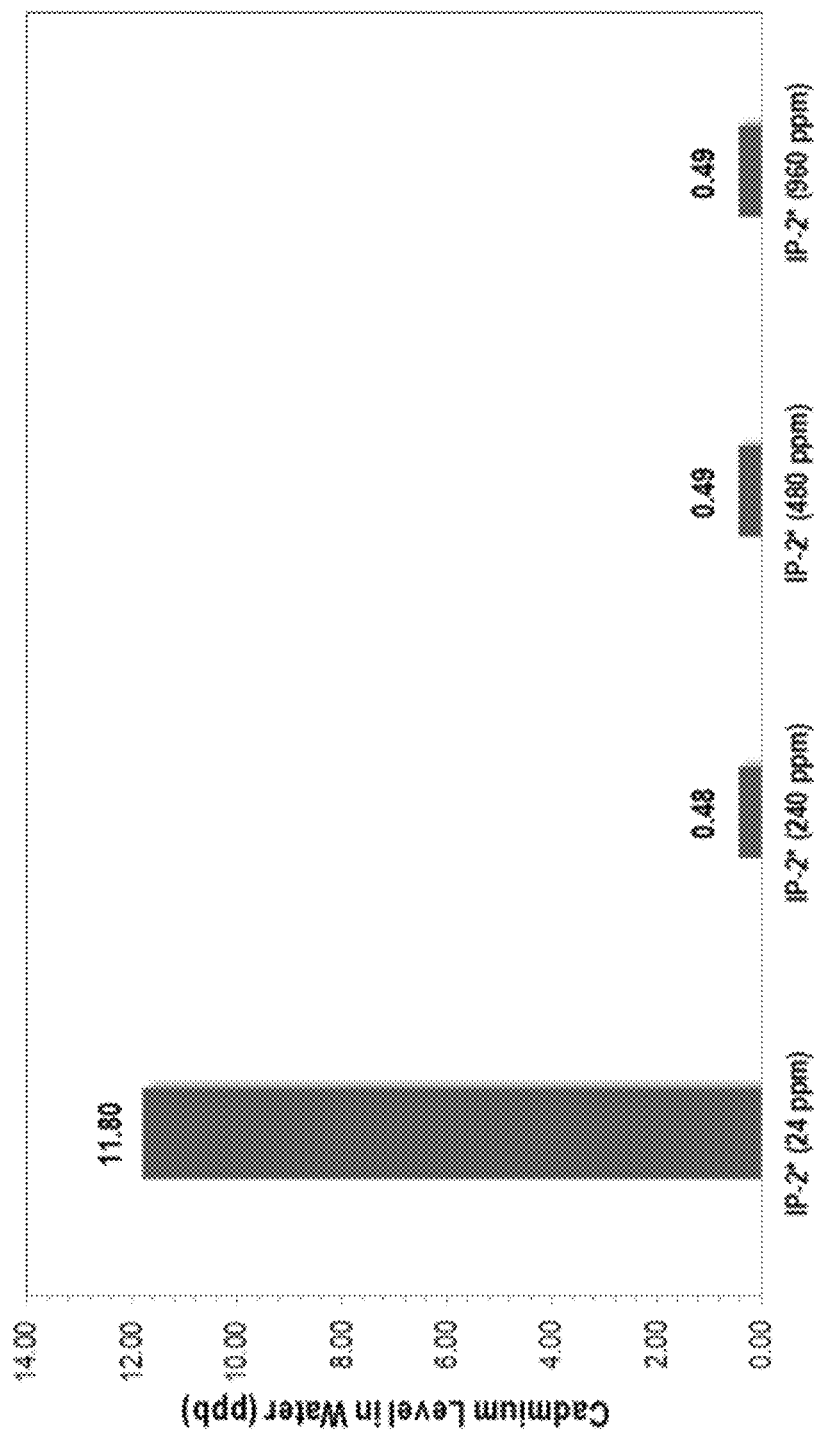
FIG. 3 shows the results of decontamination of a solution containing 11000 ppb of cadmium using various dosages of an exemplary hydraulic binder and promoter system.

The hydraulic binder and promoter system, IP-2*, was evaluated at varying concentrations, and it was found that it could provide higher efficiency than the aluminate coagulant. As illustrated in FIG. 3, IP-2* provided a reduction in the cadmium level from 11000 ppb to 11.80 ppb by using only 24 ppm of the hydraulic binder and promoter system. Further reduction was achieved by increasing the hydraulic binder and promoter concentration. At a level of 240 ppm, the residual cadmium concentration in the treated water was below 1 ppb.

Example 6

In this example, several treatment methods were evaluated for efficacy of reducing zinc contaminants in water. The starting zinc contaminated water samples contained 697 ppb of zinc. The water samples were treated with IP-1* or IP-1-N. The treatment conditions are the same as described above for Example 2. The results are provided in Table 2, below. For comparison, some water samples were treated with two commercial coagulants, ferrous chloride and sodium aluminate. The treatment conditions are the same as described above for Example 4. The results are provided in Table 3.

TABLE 2

Effect of the treatment composition on Zn concentration (ppb) in the contaminated water

| Treatment (ppm) | 60 | 200 | 600 | 900 | 1200 | 1500 |
|---|---|---|---|---|---|---|
| IP-1* | 26.1 | 12.7 | <10 | <10 | <10 | 15.3 |
| IP-1-N | 22.9 | 20.8 | <10 | <10 | <10 | <10 |

TABLE 3

Effect of the treatment composition on Zn concentration (ppb) in the contaminated water

| | Treatment (ppm) | | | | | | | |
|---|---|---|---|---|---|---|---|---|
| | 100 | 200 | 600 | 1000 | 2000 | 3000 | 4000 | 6000 |
| Ferrous Chloride | 621 | 679 | 647 | 726 | n/a | n/a | n/a | n/a |
| Sodium Aluminate | 105 | 135 | 32.7 | 30.9 | 41.2 | 42.3 | 48.8 | 53.7 |

Example 7

In this example, the dry blended hydraulic binder and promoter compositions were added to water containing 25 ppm selenium contaminants. Prior to adding the hydraulic binder and promoter, the pH of the contaminated water sample was adjusted to pH 4 with the addition of HCl to reduce the selenate compounds to selenite compounds. The solutions were agitated for 3 hours to promote mixing. The solids are then allowed to settle and are subsequently removed through gravitational filtration. The dry blended hydraulic binder and promoter compositions are provided in Table 4. The promoter in each experiment was elemental sulfur. The amount of selenium removed was determined by analyzing the liquids with ICP and/or the solids with XRF analysis.

TABLE 4

Effect of treatment composition on Se concentration in the contaminated water

| Experiment No. | 1 | 2 | 3 | 4 | 5 | 6 |
|---|---|---|---|---|---|---|
| Selenium Removal | 49.44% | 15.36% | 5.50% | 49.62% | 100.00% | 34.90% |
| Hydraulic Binder Type | Cement A | Cement B | Cement C | Cement A | Cement A | Cement A |
| Dosage of Treatment System (ppm) | 1200 | 1200 | 1000 | 2200 | 1400 | 600 |
| Weight Ratio (Hydraulic Binder:Promoter) | 1:0.2 | 1:0.2 | 1:0 | 1:0.1 | 1:0.4 | 1:0.2 |

Example 8

In this example, the dry blended hydraulic binder and promoter compositions were added to water containing 25 ppm arsenic. Prior to adding the hydraulic binder and promoter, 20 ppm of commercial bleach was added to the contaminated water to oxidize the arsenite compounds to arsenate compounds. The solutions were agitated for 3 hours to promote mixing. The solids are then allowed to settle and are subsequently removed through gravitational filtration. The dry blended hydraulic binder and promoter compositions are provided in Table 5. The promoter in each experiment was elemental sulfur. The amount of arsenic removed was determined by analyzing the liquids with ICP.

TABLE 5

Effect of treatment composition on As concentration in the contaminated water

| Experiment No. | 1 | 2 | 3 | 4 | 5 | 6 |
|---|---|---|---|---|---|---|
| Arsenic Removal | 87.00% | 65.00% | 66.00% | 100.00% | 100.00% | 71.90% |
| Hydraulic Binder Type | Cement A | Cement B | Cement C | Cement A | Cement A | Cement A |
| Dose of Treatment System (ppm) | 600 | 600 | 600 | 1200 | 1100 | 300 |
| Weight Ratio (Hydraulic Binder:Promoter) | 1:0.2 | 1:0.2 | 1:0.2 | 1:0.2 | 1:0.1 | 1:0.2 |

Example 9

In this example, the dry blended hydraulic binder and promoter compositions were added to lab generated water containing 600 ppb phosphorus (sodium phosphate). The water sample was prepared by the addition of sodium phosphate to lab generated water. The solutions were agitated for 3 hours to promote mixing. The solids are then allowed to settle and are subsequently removed through gravitational filtration. results are shown in Table 6. The amount of phosphorus removed was determined by analyzing the liquids with ICP. It was observed that the phosphorus concentration was reduced to 3 ppb when the hydraulic binder and promoter system was applied.

TABLE 6

Effect of treatment composition on phosphorus concentration (ppb) in the contaminated water

| Dosage (ppm) | 20 | 60 | 200 | 600 | 1200 | 2000 |
|---|---|---|---|---|---|---|
| Treatment: IP-1-N | 571 | 29.2 | 6.3 | 8.3 | 5.8 | 3.6 |
| Treatment: IP-1* | 496 | 8.5 | 14.4 | 5.1 | 3 | 3 |

Example 10

In this example, the dry blended hydraulic binder and promoter compositions were added to water containing 15.5 ppm phosphorus. The solutions were agitated for 3 hours to promote mixing. The solids are then allowed to settle and are subsequently removed through gravitational filtration. The results are shown in Table 7. The amount of phosphorus removed was determined by analyzing the liquids with ICP.

TABLE 7

Effect of treatment composition on phosphorus concentration (ppm) in the contaminated water

| Dosage (ppm) | 200 | 600 | 1200 | 2000 |
|---|---|---|---|---|
| Treatment: IP-1* | 0.12 | 0.14 | 0.12 | 0.09 |
| Treatment: IP-1* | 0.11 | 0.11 | 0.13 | 0.08 |
| Treatment: IP-1-N | 0.13 | 0.09 | 0.01 | 0.09 |

Example 11

In this comparative example, the ferrous chloride or sodium aluminate compositions were added to water containing 26.4 ppm phosphorus. The solutions were agitated for 3 hours to promote mixing. The solids were then allowed to settle and were subsequently removed through gravitational filtration. The results are shown in Table 8. The amount of phosphorus removed was determined by analyzing the liquids with ICP.

TABLE 8

Effect of treatment composition on phosphorus concentration (ppm) in the contaminated water

| Dosage (ppm) | 100 | 200 | 600 | 1000 |
|---|---|---|---|---|
| Treatment: Ferrous chloride | 0.71 | 0.1 | 0.02 | 0.05 |
| Treatment: Sodium aluminate | 0.07 | 0.07 | 0.06 | 0.06 |

In the preceding specification, various embodiments have been described with reference to the examples. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

We claim:

1. A method for removing one or more contaminants from an aqueous stream comprising: a) adding one or more hydraulic binders and one or more nucleophilic promoters to the aqueous stream; b) allowing the one or more hydraulic binders, the one or more promoters and the one or more contaminants to interact to form solidified contaminants; and c) separating the solidified contaminants from the aqueous stream;
wherein the one or more nucleophilic promoters are selected from the group consisting of elemental sulfur, nitriles, organophosphines, and ethers; and wherein the one or more hydraulic binders are added to the aqueous stream in the form of a powder mixture;

wherein the aqueous stream is selected from the group consisting of drinking water, ground water, well water, surface water, agricultural waters, wastewater from mining processes, geothermal fluids, water from mining processes associated with smelting, mine dewatering, tailing impoundment treatment, flotation, autoclave, acid mine drainage, wastewater from flue gas, desulfurization units, runoff from wet fly ash ponds, and groundwater streams; and wherein the dosage of the one or more hydraulic binders added to the aqueous stream is about 10 ppm to about 50,000 ppm.

2. The method of claim 1, wherein the one or more contaminants are selected from the group consisting of mercury, cadmium, zinc, manganese, lead, copper, chromium, molybdenum, gallium, indium, thallium, other metal contaminants, including the various oxidation states of these metals and compounds comprising these metals.

3. The method of claim 1, wherein the one or more contaminants are selected from the group consisting of antimony, arsenic, selenium, phosphates, other non-metallic contaminants, and compounds comprising arsenic, selenium, phosphates, including the various oxidation states of these non-metals and compounds comprising these non-metals.

4. The method of claim 1, wherein the one or more contaminants comprise arsenic-based, selenium-based, cadmium-based, zinc-based, mercury-based, iron-based, chromium-based and/or phosphate-based contaminants.

5. The method of claim 1, wherein the one or more hydraulic binders are selected from the group consisting of hydraulic lime, naturally occurring cements, pozzolana cements, gypsum cements, phosphate cements, high alumina cements, slag cements, cement kiln dust, silica cements, high alkalinity cements, Portland cements and combinations thereof.

6. The method of claim 1, wherein the one or more nucleophilic promoters is elemental sulfur.

7. The method of claim 1, wherein the aqueous stream is selected from wastewater from flue gas, desulfurization units, runoff from wet fly ash ponds, and groundwater streams.

8. The method of claim 1, wherein the separation step is accomplished by gravity settling, filtration, or another mechanical separation method.

9. The method of claim 1, wherein the method further comprises stirring or agitating the aqueous stream after the one or more hydraulic binders and one or more nucleophilic promoters have been added.

10. The method of claim 1, wherein the one or more hydraulic binders and one or more nucleophilic promoters are premixed before being added to the aqueous stream.

11. The method of claim 10, wherein the one or more hydraulic binders and one or more nucleophilic promoters are added as a dry blend.

12. The method of claim 10, wherein the one or more hydraulic binders and one or more nucleophilic promoters are added as a dispersion.

13. The method of claim 1, wherein the method further comprises adding a flocculant.

14. The method of claim 1, wherein the aqueous stream is selected from the group consisting of wastewater from mining processes, water from mining processes associated with smelting, mine dewatering, tailing impoundment treatment, and acid mine drainage.

15. The method of claim 1, wherein the one or more contaminants are removed from the aqueous stream to below about 2.0 ppb.

16. The method of claim 1, wherein the aqueous stream is not contaminated sludge.

* * * * *